(12) United States Patent
Rodrigues (10) Patent No.: US 11,774,787 B2
(45) Date of Patent: Oct. 3, 2023

(54) DUAL-SIDED TRANSPARENT DISPLAY PANEL

(71) Applicant: Toyota Motor Engineering & Manufacturing North America, Inc., Plano, TX (US)

(72) Inventor: Sean P. Rodrigues, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/939,184

(22) Filed: Sep. 7, 2022

(65) Prior Publication Data

US 2023/0004029 A1    Jan. 5, 2023

Related U.S. Application Data

(62) Division of application No. 16/897,577, filed on Jun. 10, 2020, now Pat. No. 11,513,380.

(51) Int. Cl.
| | | |
|---|---|---|
| *G02F 1/1333* | (2006.01) | |
| *F21V 8/00* | (2006.01) | |
| *G02F 1/137* | (2006.01) | |
| *G02F 1/1337* | (2006.01) | |

(52) U.S. Cl.
CPC .......... *G02F 1/1333* (2013.01); *G02B 6/005* (2013.01); *G02B 6/0065* (2013.01); *G02B 6/0068* (2013.01); *G02F 1/137* (2013.01); *G02F 1/133723* (2013.01); *G02F 1/133342* (2021.01)

(58) Field of Classification Search
None
See application file for complete search history.

(56) References Cited

U.S. PATENT DOCUMENTS

| | | |
|---|---|---|
| 5,953,469 A | 9/1999 | Zhou |
| 7,193,666 B2 | 3/2007 | Choi et al. |
| 7,542,635 B2 | 6/2009 | Coleman |
| (Continued) | | |

OTHER PUBLICATIONS

Zhou et al., "Full Color Waveguide Liquid Crystal Display," Optics Letters, vol. 42, No. 18, Sep. 15, 2017.
(Continued)

*Primary Examiner* — Thanh Nhan P Nguyen
(74) *Attorney, Agent, or Firm* — Christopher G. Darrow; DARROW MUSTAFA PC (57) ABSTRACT

Embodiments of a dual-sided transparent display panel are presented herein. One embodiment comprises a first panel subassembly and a second panel subassembly, each of the first and second panel subassemblies including a plurality of adjacent layers, the plurality of adjacent layers including, from an innermost layer to an outermost layer, a first electrode layer, a first polyimide layer, a liquid-crystal matrix, a second polyimide layer, a second electrode layer, and a glass layer; a waveguide disposed between an inner surface of the first electrode layer of the first panel subassembly and an inner surface of the first electrode layer of the second panel subassembly; and one or more light sources disposed along an edge of the waveguide that is perpendicular to the inner surface of the first electrode layer of the first panel subassembly and the inner surface of the first electrode layer of the second panel subassembly.

14 Claims, 5 Drawing Sheets

(56) References Cited

U.S. PATENT DOCUMENTS

| | | | |
|---|---|---|---|
| 8,362,992 B2 | 1/2013 | Kuhlman et al. | |
| 2003/0210360 A1* | 11/2003 | Yoshida | G02F 1/13362 349/96 |
| 2013/0127980 A1 | 5/2013 | Haddick et al. | |
| 2019/0302523 A1 | 10/2019 | Okuyama | |

OTHER PUBLICATIONS

Moynihan, "What Are Quantum Dots, and Why Do I Want Them in My TV?", found at: https://www.wired.com/2015/01/primer-quantum-dot/ (Jan. 19, 2015).

Li, "Understanding Waveguide: the Key Technology for Augmented Reality Near-eye Display (Part I)" found at: https://virtualrealitypop.com/understanding-waveguide-the-key-technology-for-augmented-reality-near-eye-display-part-i-2b16b61f4bae (Jun. 18, 2019).

* cited by examiner

A user on one side of the transparent display can view an image intended for him or her at the same time another user on the opposite side of the transparent display views an image intended for that other user, and neither user sees the image (reversed or otherwise) intended for the user on the opposite side. Instead, the portions of the display panel not containing an image intended for a user looking at the applicable side

DUAL-SIDED TRANSPARENT DISPLAY PANEL

CROSS-REFERENCE TO RELATED APPLICATIONS

The present application is a Divisional of U.S. patent application Ser. No. 16/897,577, filed on Jun. 10, 2020, which is herein incorporated by reference in its entirety.

TECHNICAL FIELD

The subject matter described herein relates in general to display devices and, more specifically, to a dual-sided transparent display panel.

BACKGROUND

In some applications, it is advantageous for a display panel of a display device to be transparent. In some cases, it is also advantageous for the transparent display panel to be viewable from both sides by different users at the same time. Designing and implementing such a transparent display panel presents several challenges, however.

SUMMARY

Embodiments of a dual-sided transparent display panel are presented herein. In one embodiment, a dual-sided transparent display panel comprises a first panel subassembly and a second panel subassembly. Each of the first and second panel subassemblies includes a plurality of adjacent layers, the plurality of adjacent layers including, from an innermost layer to an outermost layer, a first electrode layer, a first polyimide layer, a liquid-crystal matrix, a second polyimide layer, a second electrode layer, and a glass layer. The dual-sided transparent display panel also includes a waveguide disposed between an inner surface of the first electrode layer of the first panel subassembly and an inner surface of the first electrode layer of the second panel subassembly. The dual-sided transparent display panel also includes one or more light sources disposed along an edge of the waveguide that is perpendicular to the inner surface of the first electrode layer of the first panel subassembly and the inner surface of the first electrode layer of the second panel subassembly.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Dual-sided display technology exists, but conventional solutions suffer from three significant shortcomings and fail to achieve a dual-sided transparent display. First, in some implementations, a user looking at one side of the display, in addition to seeing an image intended for him or her, can also see an image intended for a user on the opposite side of the display, and the two images may overlap and interfere with each other, impairing the clarity of the intended image. This is sometimes referred to as the "occlusion" problem. Second, in some implementations, a user looking at one side of the display, in addition to seeing an image intended for him or her, can also see a backward (horizontally flipped) image intended for a user on the opposite side of the display, causing distraction or confusion, whether the reversed image overlaps with the intended image or not. This is sometimes referred to as the "obversion" problem. Third, in some implementations, light is intentionally blocked between the two sides of the display to avoid occlusion and obversion, resulting in a dark region delineating an image intended for a user on either side of the display. This is sometimes referred to as the "obstruction" problem.

Various embodiments described herein overcome these shortcomings of conventional dual-sided display panels to provide a true dual-sided transparent display panel. One principle underlying the embodiments described herein is that light propagating through a waveguide becomes visible only when it is scattered (e.g., refracted). This principle is employed in conjunction with an edge-lighted design to provide a dual-sided transparent display panel that displays images independently on both sides of the display panel without occlusion, obversion, or obstruction. That is, a user on one side of the transparent display can view an image intended for him or her at the same time another user on the opposite side of the transparent display views an image intended for that other user, and neither user sees the image (reversed or otherwise) intended for the user on the opposite side. Instead, the portions of the display panel not containing an image intended for a user looking at the applicable side of the display panel appear transparent to that user, and the same applies to a user looking at the opposite side of the display panel.

Figure 1A:
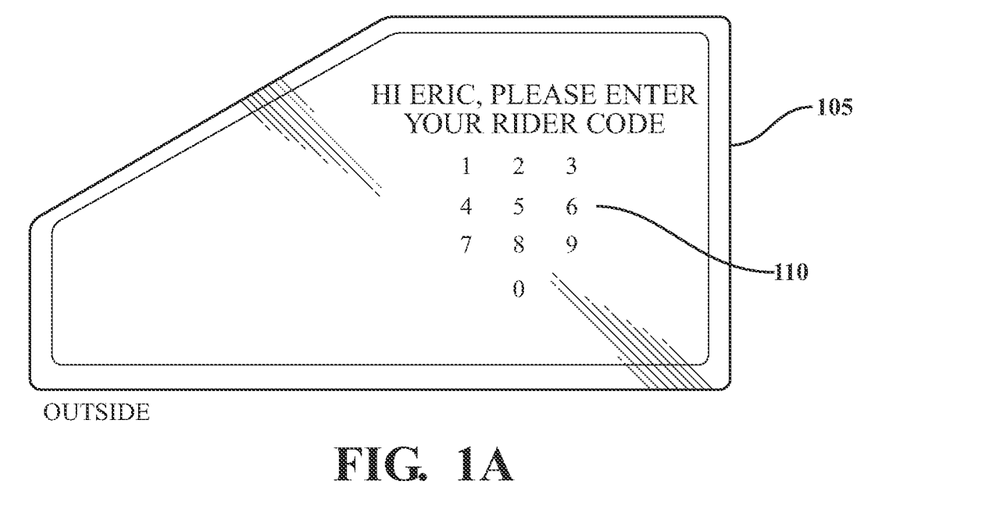
FIG. 1A illustrates the exterior side of a vehicle smart window that includes a dual-sided transparent display panel, in accordance with an illustrative embodiment of the invention.

Referring to FIG. 1A, it illustrates the exterior side of a vehicle smart window 105 that includes a dual-sided transparent display panel, in accordance with an illustrative embodiment of the invention. In the example of FIG. 1A, a user (e.g., a car-sharing customer) is about to enter a vehicle (not shown in FIG. 1A), and the vehicle smart window 105 prompts the user, via displayed outside image 110, to enter a rider code to gain entry. In this embodiment, vehicle smart window 105 can, at the same time, display a completely different image (inside image 115, a passenger-verification message) to one or more occupants inside the vehicle, as illustrated in FIG. 1B.

Figure 1B:
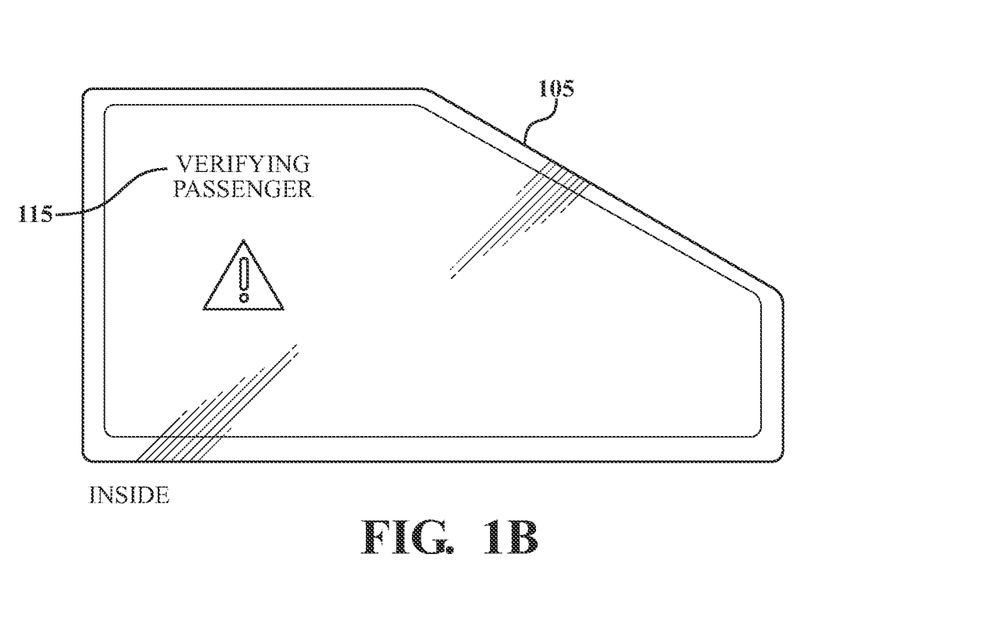
FIG. 1B illustrates the interior side of a vehicle smart window that includes a dual-sided transparent display panel, in accordance with an illustrative embodiment of the invention.

A vehicle smart window 105, as depicted in FIGS. 1A and 1B, is merely one example of a variety of applications for a dual-sided transparent display panel. Other applications include, without limitation, a smart store window (e.g., to display advertising outside the store, direct customers inside the store to products of interest, etc.), informational kiosks at airports and bus stations, education, and gaming/entertainment.

Figure 2:
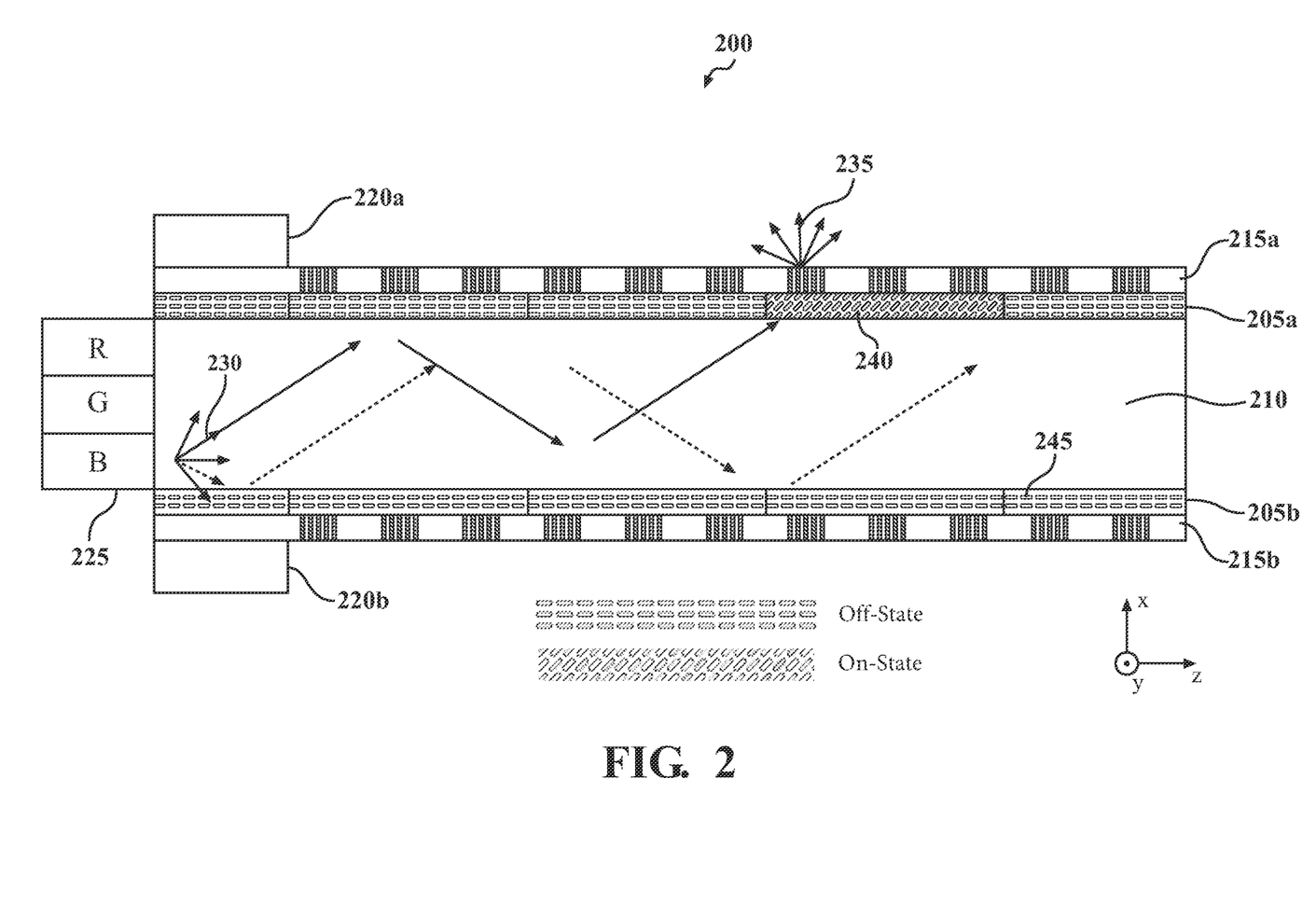
FIG. 2 is a cross-sectional diagram a first embodiment of a dual-sided transparent display panel.

FIG. 2 is a cross-sectional diagram a first embodiment of a dual-sided transparent display panel 200. This embodiment includes a first layer of electro-optic material 205a and a second layer of electro-optic material 205b, each of which has an inner surface (the surface closest to the axis of symmetry of the waveguide 210) and an outer surface (the surface farthest from the axis of symmetry just mentioned). As shown in FIG. 2, waveguide 210 is disposed between the inner surface of the first layer of electro-optic material 205a and the inner surface of the second layer of electro-optic material 205b. In some embodiments, waveguide 210 is made of glass.

Dual-sided transparent display panel 200 also includes a first grating coating 215a adjacent to the outer surface of the first layer of electro-optic material 205a and a second grating coating 215b adjacent to the outer surface of the second layer of electro-optic material 205b. In one embodiment, the first and second grating coatings (215a and 215b) are periodic grating coatings that include alternating diffusive and plain-glass regions.

Dual-sided transparent display panel 200 also includes light sources 225 along an edge of waveguide 210 that is perpendicular to the inner and outer surfaces of the first and second layers of electro-optic material (205a and 205b). In this embodiment, the light sources include red, green, and blue light sources in accordance with the RGB standard. In some embodiments, the light sources 225 are lasers. In other embodiments, the light sources 225 are light-emitting diodes (LEDs). In one embodiment, the LEDs are Micro-LEDs. In the coordinate system shown in FIG. 2, the light sources 225 are disposed along an edge of waveguide 210 that runs in the y direction (into and out of the page) and faces the negative z direction. In the embodiment shown in FIG. 2, dual-sided transparent display panel 200 is thus edge-lighted by light sources 225.

As diagramed in FIG. 2, light emitted from light sources 225 propagates along waveguide 210 in the z direction. In this embodiment, the first layer of electro-optic material 205a and the second layer of electro-optic material 205b can be, for example, an active liquid-crystal matrix or, in a different embodiment, a passive liquid-crystal matrix. In one embodiment, the first and second layers of electro-optic material (205a and 205b) are thin-film-transistor (TFT) liquid-crystal matrices.

As those skilled in the art are aware, a liquid-crystal matrix is a special type of material that has two different refractive indices, $n_e$ (extraordinary) and $n_o$ (ordinary), depending on the electro-optical state of the material. In response to electrical control (e.g., a voltage) from driver circuitry (not shown in FIG. 2), the molecules of a liquid-crystal matrix can be caused to orient themselves in an "off" state or an "on" state. In FIG. 2, the vertical lines in first layer of electro-optic material 205a and second layer of electro-optic material 205b delineate the boundaries of rows or columns of pixels (in the y direction) in dual-sided transparent display panel 200.

Refer to the legend in FIG. 2 for the "on" and "off" states. Pixels with molecules oriented in the "off" (reflective) state 245 cause light such as the blue light 230 to be totally internally reflected within waveguide 210. The concept of total internal reflection (TIR) is well known in the waveguide-related art. As shown in FIG. 2, the oblong-shaped molecules oriented in the "off" state (245) are oriented substantially parallel to the z-axis (parallel to the direction in which light propagates within waveguide 210). Thus, a viewer looking at one of the sides of the dual-sided transparent display panel 200 in the positive or negative x direction would not see the blue light 230 at those pixel positions. Pixels with molecules oriented in the "on" (transmissive) state 240, on the other hand, are oriented at an angle relative to the z-axis, permitting light to exit waveguide 210, the blue light 230 mentioned earlier being diffused by first grating coating 215a to produce diffused and emitted blue light 235 that is visible to a user looking at dual-sided transparent display panel 200 in the negative x direction. As those skilled in the art will recognize, the individual pixels can be controlled (i.e., placed in the "on" or "off" state) using the driver circuitry mentioned above. Importantly, this can be done independently for the two sides of dual-sided transparent display panel 200 (the side facing the positive x direction and the side facing the negative x direction) to permit different images to be displayed on the two opposite sides of dual-sided transparent display panel 200 simultaneously.

As shown in FIG. 2, dual-sided transparent display panel 200 also includes first light-blocking element 220a and second light-blocking element 220b. These light-blocking elements prevent light from leaking in the x direction from a predetermined portion (e.g., a rectangular strip) of dual-sided transparent display panel 200 adjacent to the edge of waveguide 210 (the perpendicular edge mentioned above) along which light sources 225 edge-light the display panel. In other words, the light-blocking elements 220a and 220b block light that is not totally internally reflected near the edge of the waveguide 210 closest to the light sources 225.

In variations of the first embodiment (the embodiment shown in FIG. 2), a different type of electro-optic material other than a liquid-crystal matrix can be used.

Figure 3A:
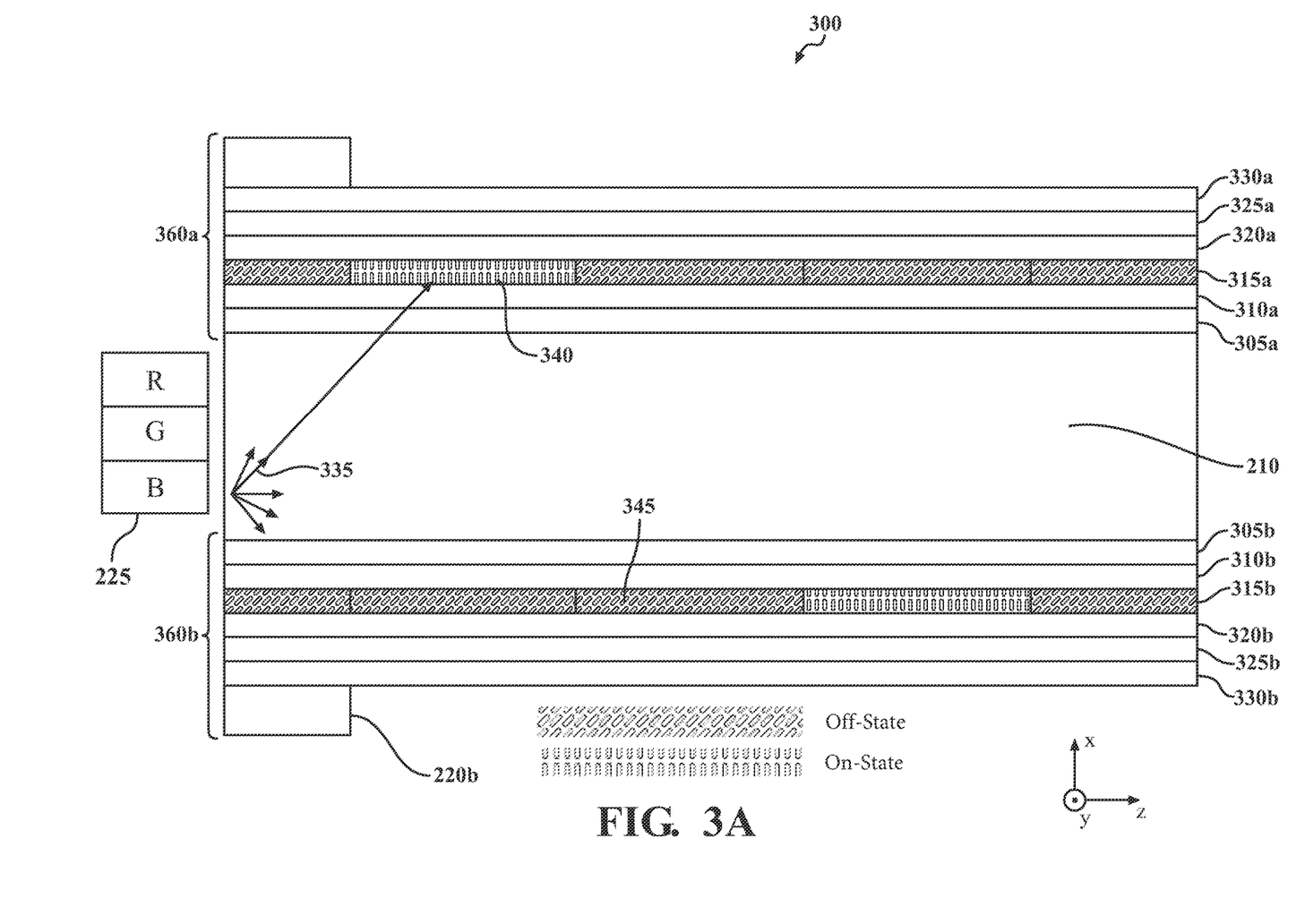
FIG. 3A is a cross-sectional diagram of a second embodiment of a dual-sided transparent display panel in an illustrative molecular configuration of the liquid-crystal matrices.

FIG. 3A is a cross-sectional diagram of a second embodiment of a dual-sided transparent display panel 300 in an illustrative molecular configuration of the liquid-crystal matrices. In this embodiment, the first and second grating coatings 215a and 215b in the embodiment of FIG. 2 are omitted, and other layers are added to each side of the overall display panel. In this embodiment, the liquid-crystal matrices themselves are capable of scattering/diffusing light, eliminating the need for the grating coatings.

The two sides of dual-sided transparent display panel 300 may be thought of as separate panel subassemblies. A first panel subassembly 360a of dual-sided transparent display panel 300 includes a plurality of adjacent layers. Those layers, moving from the innermost layer to the outermost layer (relative to the axis of symmetry of waveguide 210) include a first electrode layer 305a, a first polyimide layer 310a, a liquid-crystal matrix 315a, a second polyimide layer 320a, a second electrode layer 325a, and a glass layer 330a. The polyimide layers (310a and 320a) are used to place the liquid-crystal molecules in the desired orientation, when they are in their passive (default) state. The specific orientations of the molecules are discussed in greater detail below. In some embodiments, the electrode layers (305a, 325a) include Indium Tin Oxide (ITO).

A second panel subassembly 360b of dual-sided transparent display panel 300 includes a plurality of adjacent layers that correspond to those in the first panel subassembly 360a. Those layers, moving from the innermost layer to the outermost layer (relative to the axis of symmetry of waveguide 210), include a first electrode layer 305b, a first polyimide layer 310b; a liquid-crystal matrix 315b; a second polyimide layer 320b; a second electrode layer 325b, and a glass layer 330b. As mentioned above, in some embodiments, the electrode layers (305b, 325b) include Indium Tin Oxide (ITO).

In this embodiment, a waveguide 210 is disposed between the inner surface of the first electrode layer 305a of the first panel subassembly 360a and the inner surface of the first electrode layer 305b of the second panel subassembly 360b. In some embodiments, waveguide 210 is made of glass, as in the embodiment shown in FIG. 2.

Dual-sided transparent display panel 300 also includes light sources 225 along an edge of waveguide 210 that is perpendicular to the inner surface of the first electrode layer 305a of the first panel subassembly 360a and the inner surface of the first electrode layer 305b of the second panel subassembly 360b. In this embodiment, the light sources include RGB light sources. In some embodiments, the light sources 225 are lasers. In other embodiments, the light sources 225 are light-emitting diodes (LEDs). In the coordinate system shown in FIG. 3A, the light sources 225 are disposed along an edge of waveguide 210 that runs in they direction (into and out of the page) and faces the negative z direction. In the embodiment shown in FIG. 3A, dual-sided transparent display panel 300 is thus edge-lighted by light sources 225.

In some embodiments, the liquid-crystal matrix in each of the panel subassemblies (360a and 360b) includes nematic liquid crystals. Refer to the legend for the "on" and "off" states in FIG. 3A. As depicted in FIG. 3A, the oblong-shaped molecules making up the nematic liquid crystals can be oriented at an angle (less than 90 degrees) relative to the positive z-axis, when in the passive or "off" state (see molecules oriented in the "off" state 345 in FIG. 3A). When the oblong-shaped molecules are in the "on" state, they are aligned approximately perpendicularly to waveguide 210 (see molecules oriented in the "on" state 340 in FIG. 3A). In the illustrative configuration of the molecules depicted in FIG. 3A, blue light 335 reaches a pixel for which the molecules are in the "on" state (340), which permits the blue light 335 to exit the first panel subassembly 360a in the positive x direction, making it visible to a user gazing toward dual-sided transparent display panel 300 in the negative x direction.

As shown in FIG. 3A, dual-sided transparent display panel 300 also includes first light-blocking element 220a and second light-blocking element 220b. These light-blocking elements prevent light from leaking in the x direction from a predetermined portion (e.g., a rectangular strip) of dual-sided transparent display panel 300 adjacent to the edge of waveguide 210 that is perpendicular to the inner surface of the first electrode layer 305a of the first panel subassembly 360a and the inner surface of the first electrode layer 305b of the second panel subassembly 360b— the edge of waveguide 210 along which light sources 225 edge-light the display panel. In other words, the light-blocking elements 220a and 220b block light that is not totally internally reflected near the edge of the waveguide 210 closest to the light sources 225.

Figure 3B:
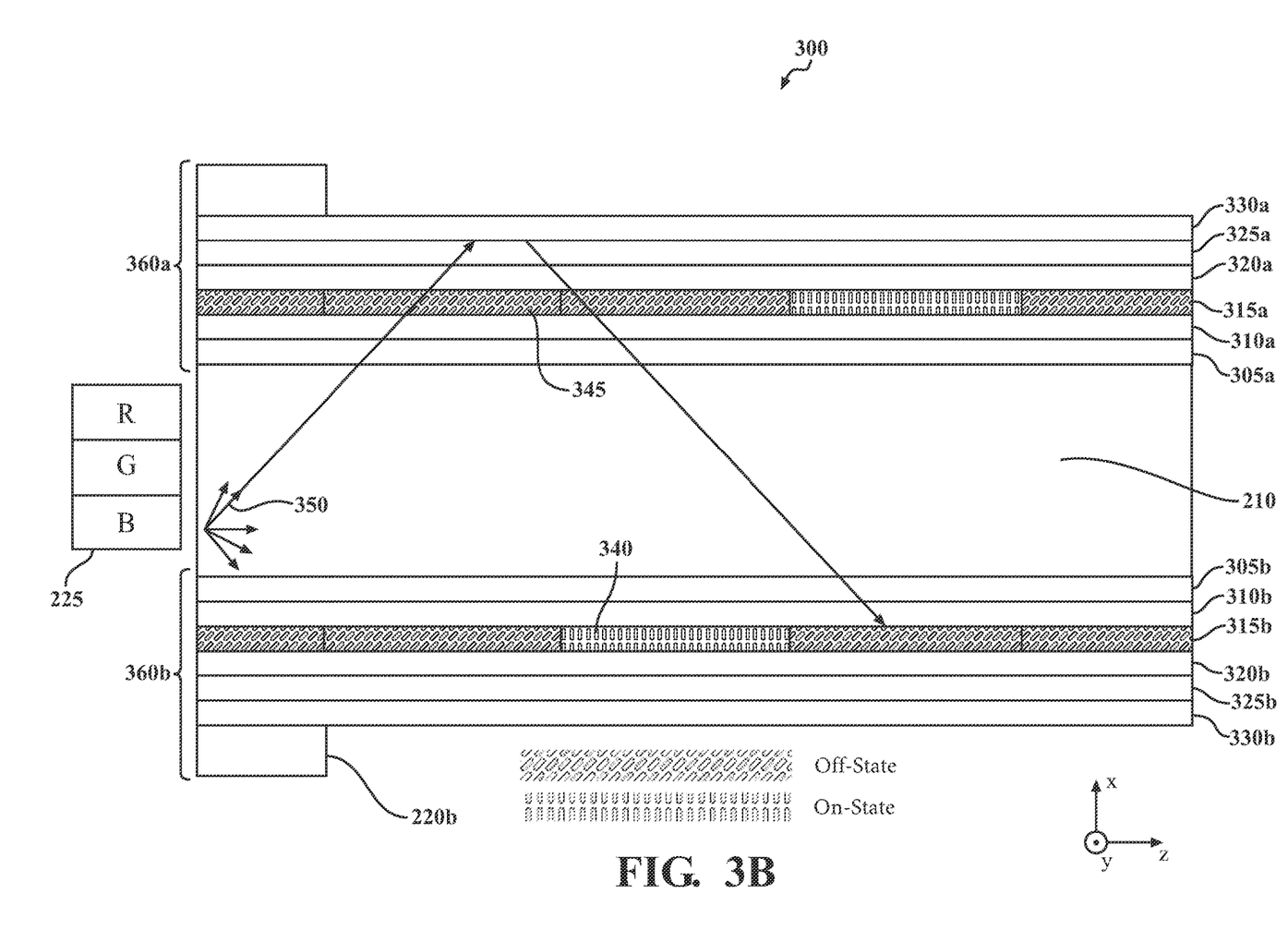
FIG. 3B is a cross-sectional diagram of a second embodiment of a dual-sided transparent display panel in another illustrative molecular configuration of the liquid-crystal matrices.

FIG. 3B is a cross-sectional diagram of a second embodiment of a dual-sided transparent display panel 300 in another illustrative molecular configuration of the liquid-crystal matrices. Refer to the legend for the "on" and "off" states in FIG. 3B. In this example, green light 350 encounters molecules in the liquid-crystal matrix 315a of the first panel subassembly 360a that are oriented in the "off" state (see molecules oriented in "off" state 345 in FIG. 3B). The orientation of those molecules (345) permits the green light 350 to propagate beyond liquid-crystal matrix 315a but causes the green light 350 to nevertheless be reflected within first panel subassembly 360a as if the dimensions of waveguide 210 were effectively expanded to encompass, e.g., the glass layer 330a of first panel subassembly 360a, as depicted in FIG. 3B. Thus, the molecules in a given panel subassembly (360a or 360b) that are oriented in the "off" state cause light from light sources 225 to be reflected by that panel subassembly toward the waveguide 210 instead of exiting that panel subassembly.

Before discussing a third embodiment of a dual-sided transparent display panel shown in FIG. 5, FIGS. 4A and 4B will be discussed to introduce some of the important principles underlying the embodiment in FIG. 5.

Figures 4A, 4B:
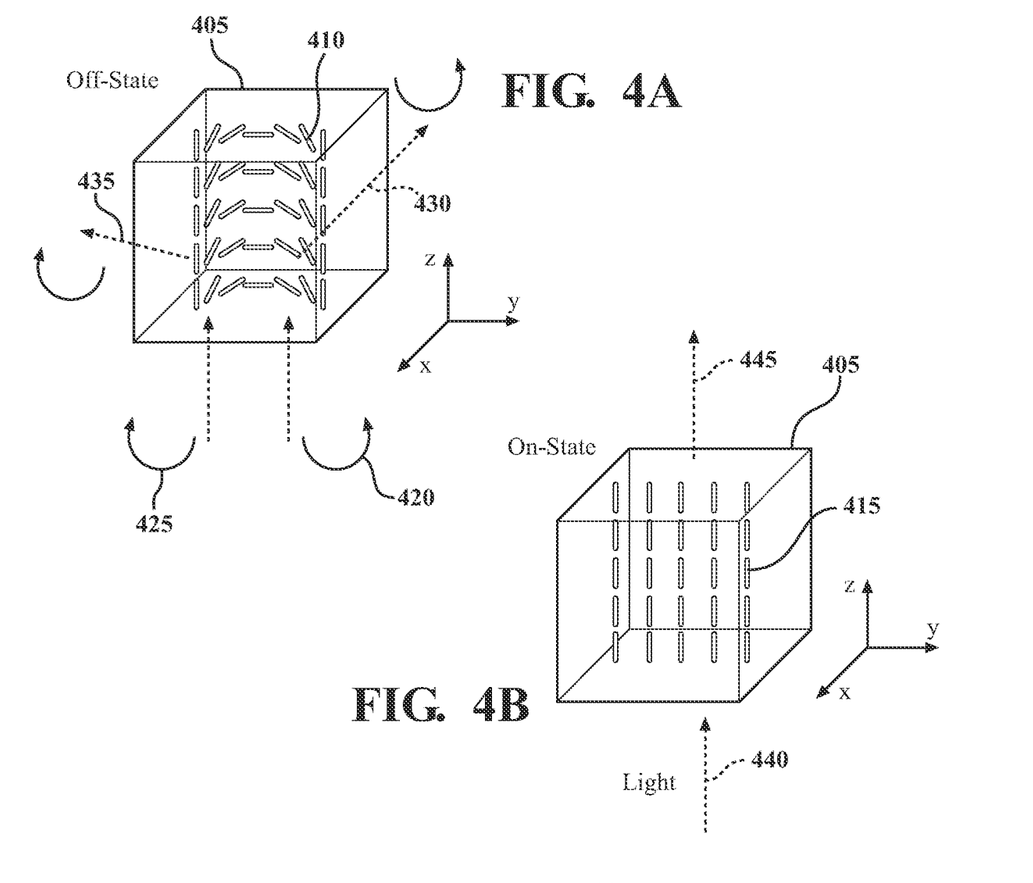
FIG. 4A is a diagram of beam splitting using circular polarization when the molecules of a liquid-crystal substance are oriented in an "off" state, in connection with a third embodiment of a dual-sided transparent display panel.
FIG. 4B is a diagram of light passing through a liquid-crystal substance when the molecules are in an orientation corresponding to an "on" state, in connection with a third embodiment of a dual-sided transparent display panel.

FIG. 4A is a diagram of beam splitting using circular polarization when the molecules of a liquid-crystal substance are oriented in an "off" state, in connection with a third embodiment of a dual-sided transparent display panel. In FIG. 4A, light with two opposite circular polarizations, counterclockwise-polarized light 420 and clockwise-polarized light 425, enters a nematic liquid-crystal substance 405. In FIG. 4A, the molecules 410 are oriented in the "off" state. This causes the counterclockwise-polarized light 420 to be diverted in the negative x direction (directed light 430) and the clockwise-polarized light 425 to be diverted in the opposite (positive x) direction (directed light 435). With the molecules in this "off" configuration and the incoming light being polarized in opposite senses (clockwise and counterclockwise or right-handed and left-handed, respectively), the nematic liquid-crystal substance 405 effectively acts as a beam splitter to direct light toward the separate sides of a dual-sided transparent display panel, depending on how the incoming light is polarized. In other words, an arrangement such as that shown in FIG. 4A exploits the chirality (or handedness) of the liquid-crystal molecules' effect on circularly polarized light, when the molecules are oriented in the "off" state.

FIG. 4B is a diagram of light passing through a liquid-crystal substance when the molecules are in an orientation corresponding to an "on" state, in connection with a third embodiment of a dual-sided transparent display panel. As shown in FIG. 4B, entering light 440 passes through nematic liquid-crystal substance 405 (see exiting light 445 in FIG. 4B) without being diverted by molecules 415 that are oriented in the "on" state. Such light will not be visible to a user looking at either side of the dual-sided transparent display panel.

Figure 5:
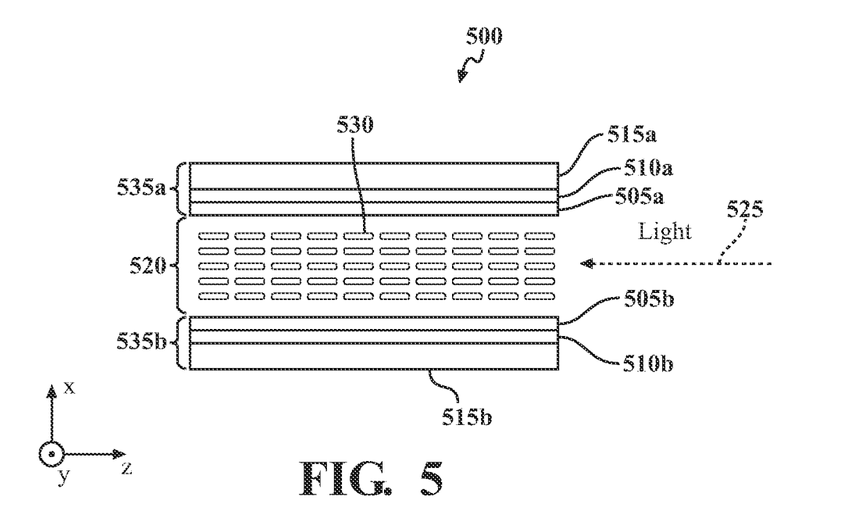
FIG. 5 is a cross-sectional diagram of a third embodiment of a dual-sided transparent display panel.

FIG. 5 is a cross-sectional diagram of a third embodiment of a dual-sided transparent display panel 500. A first panel subassembly 535*a* of dual-sided transparent display panel 500 includes a plurality of adjacent layers. Those layers, moving from the innermost layer to the outermost layer (relative to the axis of symmetry of a nematic liquid-crystal layer 520 that acts as a waveguide) include a polyimide alignment layer 505*a*, an electrode layer 510*a*, and a glass layer 515*a*.

A second panel subassembly 535*b* of dual-sided transparent display panel 500 includes a plurality of layers that correspond to those in first panel subassembly 535*a*. Those layers, moving from the innermost layer to the outermost layer (relative to the axis of symmetry of nematic liquid-crystal layer 520) include a polyimide alignment layer 505*b*, an electrode layer 510*b*, and a glass layer 515*b*.

In some embodiments, the electrode layers (510*a* and 510*b*) in the two panel subassemblies include Indium Tin Oxide (ITO).

As shown in FIG. 5, nematic liquid-crystal layer 520 is disposed between the inner surface of the polyimide alignment layer 505*a* of the first panel subassembly 535*a* and the inner surface of the polyimide alignment layer 505*b* of the second panel subassembly 535*b*. In a different embodiment, cholesteric liquid crystals are used instead of nematic liquid crystals. As discussed above, this layer acts as a waveguide with reorientable molecules within it (refer to the discussion of FIGS. 4A and 4B above) that direct, toward the glass layer 515*a* of the first panel subassembly 535*a*, light 525 from one or more light sources that is circularly polarized in a first sense and that direct, toward the glass layer 515*b* of the second panel subassembly, light 525 that is circularly polarized in a second sense that is opposite the first sense. As discussed above, the two opposite senses for circular polarization are clockwise and counterclockwise (also sometimes called right-handed and left-handed circular polarization, respectively). Though not shown in FIG. 5, the light sources for edge-lighting of the dual-sided transparent display panel can be similar, in this embodiment, to those discussed above in connection with FIGS. 2, 3A, and 3B (the first and second embodiments). In some variations of the embodiment shown in FIG. 5, a different type of liquid-crystal layer other than a nematic liquid-crystal layer can be employed.

In the embodiment shown in FIG. 5, the nematic liquid-crystal layer 520 acts as a waveguide containing reorientable molecules that, in the "off" state, can divert light to a specific one of the two sides of a dual-sided transparent display panel, depending on the sense of the entering circularly polarized light. The driver circuitry, in this embodiment, can control both the state ("on" or "off") of the molecules associated with individual pixels and the polarization of the light emitted at the edge of nematic liquid-crystal layer 520 from one or more light sources, such as the light sources 225 shown in FIGS. 2, 3A, and 3B. In some embodiments, a single light emitter is used, and the polarization is switched as needed over time to support a dual-sided transparent display panel, but in other embodiments, two emitters (one for each side of the dual-sided transparent display panel) are used. Some possible methods to switch polarizations could include photo elastic modulators, variable retarders (also known as variable wave plates), or fast-switching wave plates. In some embodiments, use can be made of diodes that emit circular polarizations from the light source itself.

In the various embodiments discussed above, the refresh cycle of a typical liquid-crystal matrix can be reduced by a factor of three in order to account for the different colors emitted by the light sources 225. Mixed colors or multiple colors can be emitted by overlapping the time frames of how long the liquid-crystal matrix is open. One possible order is R, then G, then B. A purple pixel can be created, for example, by mixing red and blue light. Therefore, the length of time the pixel is "scattering light to a viewer/user" will vary the hue of the purple color. To mix red and blue evenly, the activation time should be equal for the two colors. Also, different types of liquid crystals can be used, depending on the particular embodiment, to achieve different effects. Cholesteric liquid crystals can be used to change the refractive index. This abrupt change in refractive index can cause deflection or scattering out of the flat display panel because of its poly-domain structure.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1A-5, but the embodiments are not limited to the illustrated structure or application.

The components described above can be realized in hardware or a combination of hardware and software and can be realized in a centralized fashion in one processing system or in a distributed fashion where different elements are spread across several interconnected processing systems. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

As used herein, "cause" or "causing" means to make, command, instruct, and/or enable an event or action to occur or at least be in a state where such event or action may occur, either in a direct or indirect manner.

Aspects herein can be embodied in other forms without departing from the spirit or essential attributes thereof. Accordingly, reference should be made to the following claims rather than to the foregoing specification, as indicating the scope hereof.

What is claimed is:

1. A dual-sided transparent display panel, comprising:
   a first panel subassembly and a second panel subassembly, each of the first and second panel subassemblies including a plurality of adjacent layers, the plurality of adjacent layers including, from an innermost layer to an outermost layer, a first electrode layer, a first polyimide layer, a liquid-crystal matrix, a second polyimide layer, a second electrode layer, and a glass layer;
   a waveguide disposed between an inner surface of the first electrode layer of the first panel subassembly and an inner surface of the first electrode layer of the second panel subassembly; and
   one or more light sources disposed along an edge of the waveguide that is perpendicular to the inner surface of the first electrode layer of the first panel subassembly and the inner surface of the first electrode layer of the second panel subassembly;
   wherein the liquid-crystal matrix in each of the first and second panel subassemblies includes a plurality of molecules, the plurality of molecules, in a first orientation, causing light from the one or more light sources to be reflected by that panel subassembly toward the waveguide, the plurality of molecules, in a second orientation, permitting light from the one or more light sources to exit that panel subassembly.

2. The dual-sided transparent display panel of claim 1, wherein the liquid-crystal matrix in each of the first and second panel subassemblies includes nematic liquid crystals.

3. The dual-sided transparent display panel of claim 1, wherein the one or more light sources include red, blue, and green light sources.

4. The dual-sided transparent display panel of claim 3, wherein the red, blue, and green light sources are lasers.

5. The dual-sided transparent display panel of claim 3, wherein the red, blue, and green light sources are light-emitting diodes (LEDs).

6. The dual-sided transparent display panel of claim 1, wherein the waveguide is made of glass.

7. The dual-sided transparent display panel of claim 1, further comprising a light-blocking element disposed on an outer surface of the glass layer of each of the first and second panel subassemblies to prevent light from the one or more light sources from leaking from a predetermined portion of the dual-sided transparent display panel adjacent to the edge of the waveguide that is perpendicular to the inner surface of the first electrode layer of the first panel subassembly and the inner surface of the first electrode layer of the second panel subassembly.

8. A dual-sided transparent display panel, comprising:
   a first panel subassembly and a second panel subassembly, each of the first and second panel subassemblies including a plurality of adjacent layers, the plurality of adjacent layers including, from an innermost layer to an outermost layer, a first electrode layer, a first polyimide layer, a liquid-crystal matrix, a second polyimide layer, a second electrode layer, and a glass layer;
   a waveguide disposed between an inner surface of the first electrode layer of the first panel subassembly and an inner surface of the first electrode layer of the second panel subassembly;
   one or more light sources disposed along an edge of the waveguide that is perpendicular to the inner surface of the first electrode layer of the first panel subassembly and the inner surface of the first electrode layer of the second panel subassembly; and
   a light-blocking element disposed on an outer surface of the glass layer of each of the first and second panel subassemblies to prevent light from the one or more light sources from leaking from a predetermined portion of the dual-sided transparent display panel adjacent to the edge of the waveguide that is perpendicular to the inner surface of the first electrode layer of the first panel subassembly and the inner surface of the first electrode layer of the second panel subassembly.

9. The dual-sided transparent display panel of claim 8, wherein the liquid-crystal matrix in each of the first and second panel subassemblies includes nematic liquid crystals.

10. The dual-sided transparent display panel of claim 8, wherein the liquid-crystal matrix in each of the first and second panel subassemblies includes a plurality of molecules, the plurality of molecules, in a first orientation, causing light from the one or more light sources to be reflected by that panel subassembly toward the waveguide, the plurality of molecules, in a second orientation, permitting light from the one or more light sources to exit that panel subassembly.

11. The dual-sided transparent display panel of claim 8, wherein the one or more light sources include red, blue, and green light sources.

12. The dual-sided transparent display panel of claim 11, wherein the red, blue, and green light sources are lasers.

13. The dual-sided transparent display panel of claim 11, wherein the red, blue, and green light sources are light-emitting diodes (LEDs).

14. The dual-sided transparent display panel of claim 8, wherein the waveguide is made of glass.

* * * * *